United States Patent Office 3,219,603
Patented Nov. 23, 1965

3,219,603
EPOXY-CONTAINING CONDENSATES OF POLY-
EPOXIDES AND HYDROGENATED POLYMERIC
ACIDS, THEIR PREPARATION AND POLYMERS
James R. Scheibli, Oakland, Calif., assignor to Shell Oil
Company, New York, N.Y., a corporation of Delaware
No Drawing. Filed Feb. 13, 1962, Ser. No. 172,887
8 Claims. (Cl. 260—18)

This invention relates to new epoxy-containing materials and a method for their preparation. More particularly, the invention relates to new and valuable epoxy-containing condensates of polyepoxides and hydrogenated polymeric acids, their preparation and polymers.

Specifically, the invention provides new and particularly useful acetone-soluble epoxy-containing materials comprising condensates of a hydrogenated polymeric acid with at least 1.5 times the chemical equivalent amount of a polyepoxide containing more than one vic-epoxy group. These materials are prepared according to the present invention by adding the hydrogenated polymeric acids, preferably in small increments over a period of time, to at least 1.5 times the equivalent amount of the polyepoxide in the presence of a catalyst of the group consisting of tertiary amines, tertiary amine borates, quaternary ammonium salts and organic phosphines.

The invention further provides insoluble infusible products obtained by contacting the above-described epoxy-containing condensates with epoxy curing agents, such as, for example, amines, polybasic acid anhydrides, $BF_3$ and $BF_3$-complexes.

Linear epoxy-containing condensates of polybasic acids and polyepoxides have been prepared. While these epoxy-containing adducts can be cured with conventional epoxy curing agents to form products having excellent resistance to water and solvents, their resistance to weathering, particularly to ultra-violet radiation, prevents their use for some applications. It was unexpectedly discovered, however, that when the polyepoxide was condensed with a hydrogenated polymeric acid, the resulting cured product had unexpected resistance to weathering, both inside and outside, while still retaining the other desirable properties, such as toughness, flexibility and resistance to water and solvents.

It is therefore an object of the present invention to provide a new class of epoxy-containing materials. It is another object to provide new high molecuar weight epoxy-containing materials which are particularly suited for use in preparing surface coatings. It is still another object to provide new epoxy-containing materials which can be cured to form products having excellent flexibility and excellent resistance to water and solvents. It is a further object to provide new and useful epoxy-containing materals which can be cured to form products having improved resistance against weathering, particularly against ultraviolet radiation. It is still a further object to provide new high molecular weight epoxy-containing materials that can be readily cured with epoxy-curing-agents to form hard chemical-resistant products. It is still a further object to provide a process for preparing new and valuable epoxy-containing materials having excellent improved resistance to weathering. Other objects and advantages of the invention will become apparent from the following detailed description thereof.

It has now been found that these and other objects may be accomplished by the new products of the invention comprising acetone-soluble epoxy-containing condensates of hydrogenated polymeric acids with at least 1.5 times the chemical equivalent amount of a polyepoxide containing more than one vic-epoxy groups, said condensates being prepared according to the present invention preferably by adding the hydrogenated polymeric acid preferably in small increments over a period of time to at least 1.5 times the equivalent amount of the polyepoxide in the presence of a catalyst of the group consisting of tertiary amines, tertiary amine borates, quaternary ammonium salts and organic phosphines. The expression "equivalent amount" as used herein refers to that amount needed to furnish one acidic group per epoxy group.

The above-described novel epoxy-containing condensates of the invention have been found to be particularly suited for use in the preparation of surface coatings as they can be cured with epoxy curing agents to form valuable films.

It was also discovered that the cured films of the above-described epoxy-containing condensates had unexpectedly high resistance to weathering, particularly to outside weathering. The new products of the present invention when cured also produce coating having excellent flexibility and toughness as well as excellent resistance to solvents and water.

The polyepoxide materials to be used in preparing the condensates of the present invention comprise those organic materials which have more than one vic-epoxy group, i.e. more than one

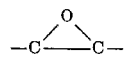

group, which group may be in a terminal position, i.e. a

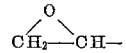

group, or in an internal position, i.e. a

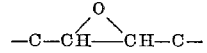

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4-bis(2,3-epoxypropoxy)benzene, 1,3-bis(2,3-epoxypropoxy)benzene, 4,4'-bis(2,3-epoxypropoxy)diphenyl ether, 1,8 - bis(2,3-epoxypropoxy)octane, 1,4-bis(2,3-epoxypropoxy)cyclohexane, 4,4'-bis(2-hydroxy-3,4'-epoxybutoxy) diphenyl dimethylmethane, 1,3 - bis(4,5-epoxypentoxy)-5 - chlorobenzene, 1,4-bis(3,4-epoxybutoxy)-2-chlorocyclohexane, 1,3 - bis(2-hydroxy-3,4-epoxybutoxy)benzene, 1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bisphenol A), 2,2-bis(4-hydroxyphenyl)butane, 4,4' - dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50. For convenience this product will be referred to hereinafter as Polyether A.

Polyether B

A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

Polyether C

By using a smaller ratio of epichlorohydrin to bisphenol, a glycidyl polyether of higher melting point was obtained. Thus Polyether C was obtained in the same manner as Polyether B except that for every mole of bisphenol there was used 1.57 moles of epichlorohydrin and 1.88 moles of sodium hydroxide. This provided a product having a melting point of about 70° C., a molecular weight of 900, and an epoxide value of 0.20 eq./100 g.

Polyether D

This glycidyl polyether of still higher melting point was prepared in like manner to that of Polyether B except that for each mole of bisphenol there was employed 1.22 moles of epichlorohydrin and 1.27 moles of sodium hydroxide. The resulting product had a melting point of 98° C., a molecular weight of 1400 and an epoxide value of 0.103 eq./100 g.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides comprises the polyepoxy-polyethers obtained by reacting, preferably in the presence of an acid-acting compound, such as hydrofluoric acid, one of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of one of these polyepoxide polyethers may be illustrated by the following:

PREPARATION OF GLYCIDYL POLYETHERS OF POLYHYDRIC ALCOHOLS

Polyether E

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amounts of 261 parts, was a pale yellow viscous liquid. It has an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether E.

Particularly preferred members of this group comprise the glycidyl polyethers of aliphatic polyhyrdic alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolenate, ethyl 9,12-octadecadienoate, butyl 9,12,15-ostadecatrienoate, ethyl elaeostearate, octyl 9,10-octadecadienoate, methyl elaeostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidizes esters of unsaturated alcohols having the ethylenic group in an internal position and polycarboxylic acids, such as, for example, di(2,3-epoxybutyl)adipate, di(2,3-epoxybutyl) oxalate, di(2,3 - epoxyhexyl)succinate, di(2,3-epoxyoctyl) tetrahydrophthalate, di(4,5-epoxydodecyl)maleate, di(2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4 - epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl-8,9,12,13-diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6-,10-11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The hydrogenated polymeric acids used in the compositions of the present invention are those obtained by polymerizing unsaturated chain acids under known conditions, such as heat, peroxides and the like, followed by hydrogenation under conditions well-known in the art. Examples of the unsaturated chain acids that may be used for subsequent hydrogenation for use in the present invention include, preferably, those containing at least 10 carbon atoms and more preferably more than 14 carbons atoms, such as, for example, dodecenedioic acid, 10,12-eicosadienedioic acid, tetradeceneioic acid, linoleic acid, linolenic acid, eleostearic acid and licanic acid.

Normally, the polymerization is effected by utilizing the lower aliphatic esters of the unsaturated acids so as to prevent decarboxylation during the heating period, and then removing the ester groups through hydrolysis. This process is illustrated in the Industrial and Engineering Chemistry article, pages 1139, vol. 38 (1946). The structure of some of the polymerized acids are shown in Industrial and Engineering Chemistry, vol. 33, page 89 (1941).

Especially preferred are the hydrogenated dimer and trimer acids as well as commercially obtained mixtures thereof.

Particularly preferred are the hydrogenated dimer and trimer acids obtained from the ethylenically unsaturated fatty acids as derived from semi-drying and drying oils, and particularly, the conjugated fatty acids containing from 12 to 20 carbon atoms.

In general, the iodine number for the unhydrogenated unsaturated polymeric acids containing from about 12 to about 20 carbon atoms will range from about 60 to about 120, depending upon the number of carbon atoms, the degree of polymerization, the relative proportions of monomer, dimer and trimer acids and the method of determination. Because the iodine number is dependent upon so many such variables this number is only a relative indication of the degree of unsaturation, or on the other hand, the degree of hydrogenation. The hydrogenated polymeric fatty acids useful in the present invention are those polymeric fatty acids wherein at least 25% of the double bonds have been hydrogenated and more preferably, when at least 50% of the double bonds have been hydrogenated. Thus, the iodine number will usually be less than about 80 and preferably less than about 60, dependent of course upon the iodine number of the initial unsaturated polymeric fatty acid.

The condensates of the present invention are prepared by reacting the hydrogenated polymeric acids with the polyepoxide in the presence of tertiary amines, tertiary amine borates, quaternary ammonium salts or organic phosphines.

The amount of the reactants to be employed is critical. Unless the proper proportions are utilized, the resulting product will be an insoluble infusible product free of epoxy groups. In order to obtain the soluble epoxy-containing condensates of the present invention, it is essential that the acidic component be reacted with at least 1.5 times chemical equivalent amount of the polyepoxide. As used herein, and in the appended claims, the expression "chemical equivalent" in relation to the acidic and polyepoxide mixtures refers to the amount needed to furnish one epoxy group for every acidic group. Preferably, the acidic component and the polyepoxides are combined in chemical equivalent ratio of 1:2 to 1:4. If the acidic component is tri-functional or higher, a large excess of the polyepoxide is preferred.

Generally, the polyepoxide should have no additional substituent capable of reacting with the hydrogenated polymeric acids other than hydroxyl.

The catalysts used in the preparation process include the tertiary amines, tertiary amine borates, quaternary ammonium salts and organo-substituted phosphines.

The tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethyl benzylamine, triphenylamine, tricyclohexyl amine, pyridine, quinoline, and the like. Preferred amines are the trialkyl, tricycloalkyl and triaryl amines, such as triethylamine, triphenylamine, tri(2,3-dimethylcyclohexyl)amine, and the alkyl dialkanol amines, such as methyl diethanol amines and the trialkanolamines such as triethanolamine. Weak tertiary amines, e.g., amines that in aqueous solutions give a pH less than 10, are particularly preferred.

The catalysts used in the process of the invention include the tertiary amine borates. These tertiary amine borates can be prepared by reacting at room temperature a tertiary amine with a borate such as, for example, methyl borate or triethyl borate. Suitable tertiary amine borates include, among others, trimethylamine borate, triethylamine borate, triethanolamine borate, triisopropanolamine borate, benzyldimethylamine borate. alpha-methylbenzyl dimethylamine borate, dimethylaminomethyl phenol borate, and tridimethyl aminomethyl phenol borate. Particularly preferred is triethanolamine borate.

The quaternary ammonium salts that may be used as catalyst for the reaction are preferably those of the formula

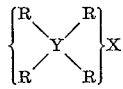

wherein Y is nitrogen, X is an ion of an inorganic acid and R is a hydrocarbon radical, such as an alkyl, cycloalkyl, aryl, alkaryl, aryalkyl, and the like radicals. Examples of these salts include, among others, benzyltrimethylammonium chloride, benzyltrimethylammonium sulfate, benzyltrimethylammonium nitrate, diphenyldimethylammonium borate, diphenyldimethylammonium nitrate, and the like.

Particularly preferred quaternary ammonium salts are those of the above formula wherein R is an alkyl, aryl, or arylalkyl radical, preferably containing no more than 12 carbon atoms and X is a chlorine or bromine, such as benzyltrimethylammonium chloride, cyclohexyltrimethylammonium bromide, phenyltrioctylammonium chloride and tetraoctylammonium chloride.

The organo-substituted phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarbyl phosphines and monohydrocarbyl phosphines, such as tricyclohexyl phosphine, triphenyl phosphine, trioctyl phosphine, diphenyl cyclohexyl, diphenyl phosphine, tributyl phosphine, trixylyl phosphine, triodoecyl phosphine, cyclohexyl octyl phosphine and the like. Particularly preferred phosphines include the trialkyl, the tricycloalkyl, the tri(alkylcycloalkyl), and the triaryl and tri(alkaryl)phosphine and particularly those wherein each of the hydrocarbon radicals attached to the phosphines atoms contains no more than 12 carbon atoms, and still more preferably no more than 8 carbon atoms, with a total number of carbon atoms preferably not being more than 30. Coming under special consideration, particularly because of their high degree of activity as catalysts are the aromatic hydrocarbyl phosphines as triphenyl phosphine.

The catalysts are preferably used in amounts preferably varying from about .05% to 3% by weight of the reactants.

Temperatures employed in the reaction will generally vary from about 50° to about 150° C. In most cases, the acidic component and polyepoxide will be liquid and the reaction may be easily effected without the addition of solvents or diluents. However, in some cases, whether either or both reactants are solids or viscous liquids it may be desirable to add diluents to assist in effecting the reaction, such as, for example, inert hydrocarbons as xylene, toluene cyclohexane, and other materials as cyclohexanone, and the like.

If solvents are employed in the reaction and the formed condensate is to be used for coating compositions, the solvent may be retained with the condensate. Otherwise the solvent should be removed by any suitable method such as vacuum distillation and the like. If the condensate is not to be utilized for some time after its formation, it will also be desirable to remove the catalyst used in the preparation. This may be accomplished by neutralization, stripping or the like.

The finished condensate produced by the above process will vary from viscous liquids to solid brittle resins. The products will be substantially free of acidic groups and will contain epoxy groups. The products prepared from the use of acids as the acidic component will contain some free OH groups, but those prepared from the anhydrides will be relatively free of formed OH groups. The products of the invention are also soluble in solvents such as acetone, toluene, benzene, xylene, and the like. They are non-heat curable, i.e. they cannot be cured to an insoluble infusible stage by mere heat alone. The products will also be of much higher molecular weight than the basic polyepoxide from which they are formed, and in most cases will contain at least 2 of the polyepoxide units and preferably 3 to 10 polyepoxide units.

As the condensates of the present invention possess epoxy groups they may be cured with epoxy curing agents to form insoluble infusible products. For this purpose, epoxy curing agents which are acidic, neutral or alkaline may be added.

Examples of the curing agents include, among other, alkalies like sodium or potassium hydroxides; alkali phenoxides like sodium phenoxide; carboxylic acids or anhydrides, such as formic acid, oxalic acid of phthalic anhydride; dimer or trimer acids derived from unsaturated fatty acids, 1,20-eicosanedioic acid, and the like. Friedel-Crafts metal halides like aluminum chloride, zinc chloride, ferric chloride or boron trifluoride as well as complexes thereof with ethers, acid anhydrides, ketones, diazonium salts, ets; salts, such as zinc fluoborate, magnesium perchlorate and zinc fluosilicate; phosphoric acid and partial esters thereof including n-butyl orthophosphate, diethyl orthophosphate, hexaethyl tetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-diethyl-1,3-propane diamide, 1,2-diamino-2-methylpropane, 2,3-diamino-2-methylbutane, 2,4-diamino-2-methylpentane, 2,4-diamino-2,6-dimethyloctane, dibutylamine, dinonylamine, distearylamine, diallyl amine, dicyclohexylamine, ethylcyclohexylamine, o-tolylnaphthylamine, pyrrolidine, 2-methylpyrrolidone, tetrahydropyridine, 2-methylpiperidene, 2,6-dimethylpiperidine, diaminopyridine, tetramethylpentane, metaphenyl diamine, and the like, and soluble adducts of amines and polyepoxides and their salts, such as described in U.S. 2,651,589 and U.S. 2,640,037.

Preferred curing agents are the polycarboxylic acids and acid anhydrides, the primary and second aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

The amount of the curing agent employed may vary widely. In general, the amount of the curing agent will vary from about 0.5% to 200% by weight of the polyepoxide. The tertiary amines and $BF_3$-complexes are preferably employed in amounts varying from about 0.5% to 20% and the metal salts preferably employed in amounts varying from about 1% to 15%. The secondary and primary amines, acids and anhydrides are preferably employed in at least stoichiometric amounts, i.e., sufficient amount to furnish one amine hydrogen or one anhydride group for every epoxy group, and more preferably stoichiometric ratios varying from 1:1 to 25:1.

The condensates of the invention are particularly useful and valuable in the preparation of surface coating compositions. In this application, the condensate is usually mixed with one or more of suitable solvents or diluents, such as, for example ketones, such as methyl isobutyl ketone, acetone, methyl ethyl ketone, isophorone, esters, such as ethyl aceton, Cellosolve acetate (ethylene glycol monoacetate), methyl Cellosolve acetate (acetate of ethylene glycol monoethyl ether), etc.; ether alcohols, such as methyl, ethyl or butyl ether of ethylene glycol or diethylene glycol, chlorinated hydrocarbons, such as trichloropropane; hydrocarbons, such as benzene, toluene, xylene and the like, to give a mixture suitable viscosity for spraying, brushing or dipping, and then the necessary curing agent as described above may be added alone or in admixture with a suitable solvent. The cure of the coating compositions thus prepared may be preferably accomplished by the application of heat. Satisfactory cures are obtained generally with temperatures of 60° C. up to 200° C.

Additional materials may be added in the preparation of the coating composition to vary the properties. Such materials include pigments, dyes, stabilizers, plasticizers and various bodying agents as oils, resins and tars. Materials, such as coal tars, asphalts, and the like are particularly desirable for use when the coatings are to be employed for the treatment of roadways, floors and the like.

The coatings prepared from the condensates of the invention are characterized, as noted above, by their hardness, chemical resistance and good adhesions and unexpected resistance to weathering and ultraviolet light. The coatings also possess good flexibility, particularly in the case of the condensates prepared from aliphatic or cycloaliphatic acids or anhydrides, and good water resistance, particularly in the case of the condensates prepared from anhydrides.

Another important application of the products of the invention is in the preparation of laminates or resinous articles reinforced with fibrous materials. Although it is generally preferred to utilize glass cloth for this purpose, any of the other suitable fibrous materials in sheet form may be employed, such as glass matting, paper asbestos paper, mica flakes, cotton bats, duck muslin, canvas, and the like.

In preparing the laminate, the sheets of fibrous material are first impreganted with the mixture containing the condensate and curing agent. This is preferably accomplished by dissolving the condensate and curing agent in acetone or a suitable solvent. The sheets of fibrous material are then impregnated with the mixture by spreading it thereon or by dripping or otherwise immersing them in the impregnant. The solvent is conveniently removed by evaporation and the mixture is cured by the application of heat as noted above.

Another important use of the compositions of the invention is the production of molded articles. A molding is first prepared by milling together a mixture of the condensate and curing agent with customary fillers and mold release agents. Usually the milled mixture is set up so that a fusible resin is first obtained. The milled mixture is then ground and molded articles obtained therefrom with conversion of the fusible resin into the infusible state with use of molding machines such as those for compression molding or transfer molding. If desired, fusible milled mixture may be prepared in preform pellets and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

EXAMPLE I

This example illustrates the improved properties obtained when hydrogenated polymeric acids are used instead of unhydrogenated unsaturated polymeric acids in preparing epoxy-containing adducts of polyepoxides.

270 parts of Empol 1014 (a viscous aliphatic polymeric acid produced by the polymerization of unsaturated fatty acids and mid-molecule and containing 1% $C_{18}$ monobasic fatty acid, 95% $C_{36}$ dibasic fatty acid and 4% $C_{54}$ tribasic fatty acid; acid value of 180–193; saponification value of 194–198 and a neutralization equivalent of 292–298) were added to 400 parts of polyether A at 135° C. About 0.40 part of triethanolamine borate in 50 parts of Empol 1014 were added. After about 2 hours of heating at 150° C., the acid number was 2.92. The resulting product was a solid having an epoxy value of 0.14 eq./100 g., an OH value of 0.19 and an acidity of <0.001. For convenience this polyepoxide condensation product prepared from a polyepoxide and an unsaturated polymeric fatty acid will be referred to as Adduct A.

430 parts of Emery Acid 3020 R (a hydrogenated viscous aliphatic polymeric acid produced by the polymerization of unsaturated fatty acids at mid-molecule and containing about 3% $C_{18}$ monoabsic fatty acid, 75% $C_{36}$ dibasic fatty acid, 22% $C_{54}$ tribasic fatty acid and having an iodine value of 25–35 as determined by A.O.C.S. Method Cd 1.25 and a neutralization equivalent of 295–305) were added to 600 parts of Polyether A. When the temperature reached 100° C., 0.60 part of triethanolamine borate in 50 parts of Emery Acid 3020R were added and the reactants heated at 150° C. for 2 hours. The resulting product was a solid having an epoxy value of 0.143 eq./100 g., an OH value of 0.207 and an acidity value of <0.001. For convenience this polyepoxide product prepared from hydrogenated polymeric fatty acids will be referred to as Adduct B.

Coating compositions were prepared by mixing each of the above described adducts in xylene and 3 parts per hundred parts of adduct of diethylene triamine and the mixtures spread on tin panels. Curing at 65° C. for 16 hours produced clear coating 1–2 mils thick which had good resistance to water, alkali and solvents.

Cured clear coatings 1 mil thick were prepared on 0.025 inch dead soft steel. The resulting coatings were subjected to exposure in the weatherometer for various exposure times and evaluated for gloss, flexibility, rust and checking. The results are tabulated as follows (10 represents no failure and 0 represents complete failure):

|  | Adduct A | Adduct B |
|---|---|---|
| 561 hours: | | |
| Gloss | 9–10 | 10 |
| Flexibility [1] | failed | passed |
| Rust | 10 | 10 |
| Checking | 10 | 10 |
| 807 hours: | | |
| Gloss | 8 | 9 |
| Flexibility [1] | | |
| Rust | 10 | 10 |
| Checking | 10 | 10 |
| 1,014 hours: | | |
| Gloss | 5 | 8 |
| Flexibility [1] | failed | passed |
| Rust | 10 | 10 |
| Checking | 10 | 10 |
| 1,495 hours: | | |
| Gloss | 1 | 4 |
| Flexibility [1] | failed | passed |
| Rust | 10 | 10 |
| Checking | 9 | 9 |

[1] Bend over ⅛" mandrel and impact the bent portion. Both adducts passed this test before exposure.

From the above data it is clear that when hydrogenated polymeric fatty acids are used in preparing the adduct, improved flexibility, and gloss are otbained than when unsaturated polymeric fatty acids are used in the polyepoxide adducts.

Related results are obtained when the adducts are prepared from Polyethers B, C, D and E instead of Polyether A.

EXAMPLE II

This example illustrates the improved properties of exterior weatherability obtained by the new and useful polyepoxide adducts of the present invention wherein hydrogenated polymeric acids are used.

Adducts A and B were prepared as in Example I and coatings of each of these adducts were prepared on various woods and after 11 months exposure at 45° south at Miami, Florida, the coatings were evaluated with 10 representing no failure and 0 complete failure. The results are as follows:

| Resin | Wood | Gloss | Cracking |
|---|---|---|---|
| Adduct A | Mahogany | 5 | 3 |
| | Western red cedar | 5 | 6 |
| Adduct B | Mahogany | 7 | 10 |
| | Western red cedar | 6 | 10 |

Related results are obtained when the adducts are prepared from epoxidized 2,2-bis(cyclohexenyl)propane and hydrogenated dimerized soyabean oil fatty acid using triethanolamine catalyst.

EXAMPLE III

Adducts A and B were prepared as in Example I and coatings of each were prepared on southern yellow pine and exposed for 9 months at 45° south of Oakland, California. The results are as follows:

| Resin | Flaking | Cracking | General appearance |
|---|---|---|---|
| Adduct A | 8-9 | 5-8 | 5-6 |
| Adduct B | 10 | 9-10 | 9 |

EXAMPLE IV

Adduct A was prepared from unsaturated dimer acids as illustrated in Example I.

400 parts of Emery Acid 3389R (a hydrogenated viscous aliphatic polymeric acid produced by the polymerization and unsaturated fatty acids at mid-molecule and containing about 1% $C_{18}$ monobasic fatty acid, 95% $C_{36}$ dibasic fatty acid, and 4% $C_{54}$ tribasic fatty acid and having an iodine value of about 15-25 as determined by the A.O.C.S. Method Cd 1-25; a neutralization equivalent of from about 284-294; an acid value of about 191-197 and a saponification value of about 193-200 mg. KOH/gram) were added to 500 parts of Polyether A and 0.50 part of triethanolamine borate and heated to 150° C. for about 1½ hours. The resulting product was a solid having an epoxy value of 0.147 eq./100 g., a OH value of 0.169 and an acidity value of 0.002. For convenience this polyepoxide product prepared from hydrogenated polymeric acids will be referred to as Adduct C. Coating compositions were prepared by mixing Adduct C in xylene and 3 parts per hundred parts of adduct of diethylene triamine and spread on tin panels. After curing at 65° C. for 16 hours, the coatings were clear and exhibited good resistance to water, alkali and solvents.

Cured clear coatings 1 mil thick were prepared from Adduct C on 0.025 inch dead soft steel. The resulting coatings were subjected to exposure in the weatherometer and evaluated for gloss, flexibility and checking. After 1000 hours the coating prepared from Adduct C had better gloss and resistance to checking as well as excellent flexibility compared to Adduct A.

Related results are obtained when the hydrogenated polymeric acid is selected from hydrogenated dimerized dodecenedioic acid, hydrogenated dimerized linoleic acid, hydrogenated dimerized linolenic acid, hydrogenated trimerized 10,12-eicosadienedioic acid and hydrogenated dimerized linseed oil fatty acids. The degree of hydrogenation ranged from about 25% to more than 75%.

I claim as my inventon:

1. An acetone-soluble vic-epoxy-group-containing condensate of (1) and acid product obtained by hydrogenating a polymerized aliphatic fatty acid prepared by polymerizing an unsaturated fatty acid having from 12 to 20 carbon atoms per molecule, said acid product having an iodine number of less than 60 with (2) at least 1.5 times the chemically equivalent amount of a polyepoxide having no additional substituent capable of reacting with the hydrogenated polymeric fatty acids other than hydroxyl and having more than one vic-epoxy group per molecule in the presence of a tertiary amine borate, the expression "equivalent amount" as used herein referring to that amount needed to furnish one vic-epoxy group per carboxyl group.

2. A condensate as in claim 1 wherein the polyepoxide is a polyglycidyl ether of a polyhydric compound of the group consisting of polyhydric alcohols and polyhydric phenols.

3. A condensate as in claim 1 wherein the polyepoxide is a polyglycidyl ether of 2,2-bis(4-hydroxyphenyl)propane.

4. A condensate as in claim 1 wherein the polyepoxide is a polyglycidyl ether of glycerol.

5. A condensate as in claim 1 wherein the acid product is prepared by hydrogenating a polymeric fatty acid prepared by polymerizing an unsaturated fatty acid containing 18 carbon atoms in the molecule to a product having an iodine value of 15-45.

6. An acetone-soluble vic-epoxy-group-containing condensate of (1) an acid product having an iodine value of from 15 to 25 obtained by hydrogenating a viscous aliphatic polymeric acid containing at least 75% $C_{36}$ dibasic fatty acid with (2) at least 1.5 times the chemically equivalent amount of a polyglycidyl ether of 2,2-bis(4-hydroxyphenyl)propane having a molecular weight of about 350 and an epoxy value of 0.50 vic-epoxy groups per hundred grams in the presence of a tertiary amine borate, the expression "equivalent amount" as used herein referring to that amount needed to furnish one vic-epoxy group per carboxyl group.

7. An acetone-soluble vic-epoxy-group-containing condensate of (1) an acid product having an iodine value of from 15 to 25 obtained by hydrogenating a viscous aliphatic polymeric acid containing about 1% $C_{18}$ monobasic fatty acid, 95% $C_{36}$ dibasic fatty acid and 4% $C_{54}$ tribasic fatty acid, said polymeric acid with (2) from 2 to 4 times the chemical equivalent amount of a diglycidyl ether of 2,2-bis(4-hydroxyphenyl)propane having a molecular weight of about 350 and an epoxy value of 0.50 vic-epoxy groups per hundred grams in the presence of triethanolamine borate, the expression "equivalent amount" as used herein referring to that amount needed to furnish one vic-epoxy group per carboxyl group.

8. An insoluble infusible product obtained by heating the epoxy-containing condensate defined in claim 7 with an approximately chemical equivalent amount of an amine at a temperature between 60° C. and 200° C., the expression "equivalent amount" as used herein refers to the amount required to furnish one amino hydrogen per epoxy group.

References Cited by the Examiner

UNITED STATES PATENTS

| | | | |
|---|---|---|---|
| 2,812,342 | 11/1957 | Peters | 260—409 |
| 2,970,972 | 2/1961 | Wear et al. | 260—18 |
| 2,970,983 | 2/1961 | Newey | 260—47 |
| 3,018,259 | 1/1962 | Frostick et al. | 260—18 |

DONALD E. CZAJA, *Primary Examiner.*

ALPHONSO D. SULLIVAN, LEON J. BERCOVITZ,
*Examiners.*